United States Patent [19]

Wrobel

[11] Patent Number: 4,728,836
[45] Date of Patent: Mar. 1, 1988

[54] STRAIN-RELIEF HOUSING FOR STRAND CONNECTORS OF SMALL ELECTRIC MOTORS

[75] Inventor: Guenter Wrobel, Villingen, Fed. Rep. of Germany

[73] Assignee: Papst-Motoren GmbH & Co. KG, St. Georgen, Fed. Rep. of Germany

[21] Appl. No.: 898,299

[22] Filed: Aug. 20, 1986

[30] Foreign Application Priority Data

Feb. 17, 1986 [DE] Fed. Rep. of Germany ....... 3604980

[51] Int. Cl.$^4$ .................... H01R 13/58; H01R 27/00; H02K 5/22
[52] U.S. Cl. ........................................ 310/71; 310/42; 310/89; 439/456
[58] Field of Search ................ 310/43, 71, 42, 89; 339/103 M, 105, 107; 439/456

[56] References Cited

U.S. PATENT DOCUMENTS

| | | | |
|---|---|---|---|
| 2,283,544 | 5/1942 | Eaton | 439/456 |
| 3,512,120 | 5/1970 | Bean | 439/456 |
| 4,329,606 | 5/1982 | Montagu | 310/71 |
| 4,368,938 | 1/1983 | Mabuchi | 310/71 |
| 4,443,051 | 4/1984 | Aguilar | 439/457 |

FOREIGN PATENT DOCUMENTS

| | | | |
|---|---|---|---|
| 571910 | 3/1933 | Fed. Rep. of Germany | 439/456 |
| 2136170 | 8/1983 | Fed. Rep. of Germany | |
| 17480 | 9/1916 | United Kingdom | 439/456 |

Primary Examiner—Patrick R. Salce
Assistant Examiner—D. L. Rebsch
Attorney, Agent, or Firm—Barnes & Thornburg

[57] ABSTRACT

A mounting arrangement for connecting strand connectors to a stator winding of an electric motor utilizes axially aligned pockets in an end mounting plate of the stator, into which the connectors are inserted. A cover plate is then lockedly mounted onto a control portion of the end mounting plate, and together with the end plate defines a tortuous path for the strand connectors, wherein the connectors axially leaving the pockets are first bent radially outward, then bent back to the original axial direction and then bent radially outwardly again. This tortuous bending path provides for strain elimination at the point of connection of the connectors to the stator inside the pockets.

18 Claims, 8 Drawing Figures

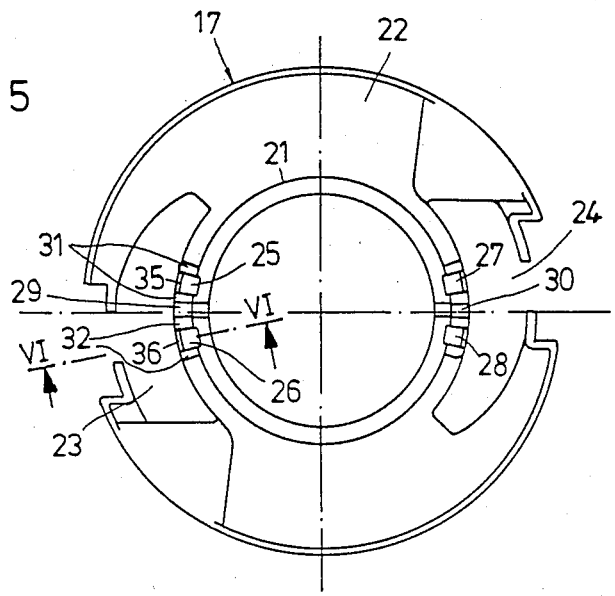
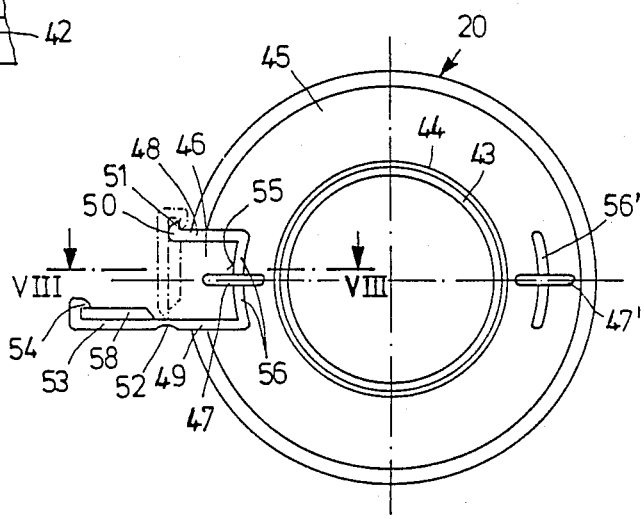

STRAIN-RELIEF HOUSING FOR STRAND CONNECTORS OF SMALL ELECTRIC MOTORS

BACKGROUND AND SUMMARY OF THE INVENTION

This invention relates to an arrangement for a strain-relief mounting of the connecting points of strand connectors, that are reinforced by means of clamp plates or by soldering, in pocket-type hollow spaces of a coil-insulating part of the stator of a small, preferably external rotor type, electric motor. The pocket-type hollow spaces extend axially of the rotor axis and are formed on an external shell surface of a cylindrical collar of an end plate, arranged on the front surface of a stator plate bundle.

In (DE-PS No. 21 36 170), an arrangement for the strain relief mounting of strand connectors of small electric motors is provided for an external rotor motor. Pocket-type hollow spaces are arranged in the coil-insulating part, which is arranged on the front side of the stator that is opposite the fastening side, and is enclosed by an external rotor bell. The spaces extend in radial direction and are equipped with an insulating covering, such as a small plate of insulating material or a tongue. The strand connectors, at their reinforced connecting points, are fitted into the pocket-type hollow spaces and are guided, after a one-time rectangular deflection, through an axial groove of the stator to the fastening side of the external rotor motor.

In this axial groove of the stator, the strand connectors are subjected to increased coil temperature. Thus, strand connectors of this type must be equipped with a high-quality insulating-material jacket and are therefore more expensive than ordinary strand connectors that do not have to withstand high temperature stress.

In addition, the threading, or inserting, of the strand connectors into the axial groove of the stator requires additional working time, making manufacturing more expensive.

This invention has an objective of providing an arrangement of the initially mentioned type, particularly for external rotor motors, that permits the use of less heat resistant strand connectors; also the arrangement makes possible the mounting of reinforced connecting points of the connector strands to coil wire ends of the stator in pocket-type hollow spaces of a coil-insulating part of the stator, which arrangement is simpler with respect to manufacturing technology and nevertheless relieves strain.

According to the invention, this objective is achieved by having pocket-type hollow spaces arranged in pairs next to one another, and separated from one another in an insulating way. The pocket-type hollow spaces are arranged at an end plate on the side of the fastening and, on the insertion side, are covered by a ring-shaped insulating cover plate. The front side of the insulating cover plate is mounted on a collar of the end plate. The insulating cover plate, in the area of the pocket-type hollow spaces, has a radial recess with an interior edge which is disposed outside the hollow spaces. The connectors extend axially out of the pocket-type hollow spaces and are caused to be deflected approximately at a right angle radially with respect to the connecting points for the connectors in the axially aligned hollow spaces, through the recess by the collar means. The recess on its radial exterior side, is closed off by a ring wall section through which the strand connectors are caused to bend, in a second deflection and then are again led in an approximately axial direction. The strand connectors subsequently are again deflected in a radial direction.

Thus three approximately rectangular, deflections exist between the free strand ends and the connecting points of the strand connectors fitted into the pocket-type hollow spaces, thus ensuring a sufficient strain relief mounting for the connecting points. Compared to the initially mentioned known arrangement (DE-PS No. 21 36 170), there are essentially three advantages: (a) the strands do not have to be guided through an axial groove of the stator; (b) the strand connectors, in the area of the stator, are not subjected to the high operating temperature existing in the coils in the vicinity of the stator; and (c) the strand connectors may have an insulation covering of less high quality and resistance to heat.

As can now be appreciated, it is possible to insert the strand connectors, with their reinforced connecting points into the pocket-type hollow spaces, radially from the outside and prior to attaching the insulating cover. Because of the space provided near the end of an edge of the support plate, the cover can be first fitted on, causing the connector to bend because of a rib on an edge of the cover, as the insulating cover plate is axially attached and locked on the collar of the end plate. This eliminates the axial threading of the individual strand connectors into the recess of the insulating cover plate before it is placed onto the end plate. This results in considerable saving of work effort during assembly and also minimizes the number of work steps during manufacturing.

An additional advantage is obtained by the arrangement of a partition, extending axially as well as radially to the outside, to provide physical separation of the strand connector ends and thus phase insulation by the insulating cover plate. The winding of the coils on the stator, that is already equipped with the two side end plates, does not obstruct the way the stator plate bundle is covered by a ring disk of the external rotor on the front side. At this front side of the insulating cover plate, there is a cooperating locking mechanism between internal hubs similar to that utilized at the cover to anchor same in a form-locking way. The end plate and the insulating cover plate are thus used for the insulation, the stabilization and the front-side covering of the stator coils.

An additional benefit is obtained by providing a rib on a radial extending portion on the cover means to not only reinforce the insulating cover plate in the edge area of its recess, but to also provide an improved support for the rectangularly deflected strand connectors in the area of the pocket-shaped hollow spaces. Also, the placement of a rib on the cover plate radially outside of and spaced from the hollow axially extending pocket, to provide for bending of the connectors, has proved beneficial.

By providing the ring wall with an edge rib that projects radially inward, a reinforcement of the ring wall section and a better support of the strand connectors after the second deflection is also achieved.

These and other objects, features, and advantages of the present invention will become more apparent from the following description, which when taken in connection with the accompanying drawings show, for the purposes of illustration only, a single embodiment in accordance with the present invention, and wherein:

BRIEF DESCRIPTION OF THE DRAWINGS

FIG. 5 is an enlarged top view of the end plate shown as by itself in FIG. 3.

FIG. 6 is a partial section view taken along the line VI—VI of FIG. 5;

FIG. 7 is a bottom view of the insulating cover plate shown by itself in FIG. 4; and FIG. 8 is a partial section view taken along the line VIII—VIII of FIG. 7.

DETAILED DESCRIPTION OF THE DRAWINGS

Figure 1:
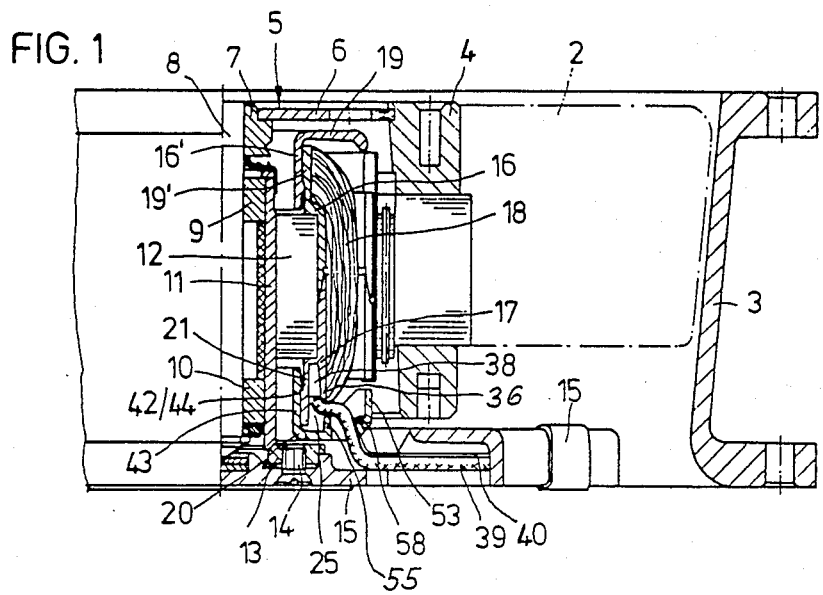
FIG. 1 is a lateral view cut in half of an axial fan external rotor motor.
Figure 3:
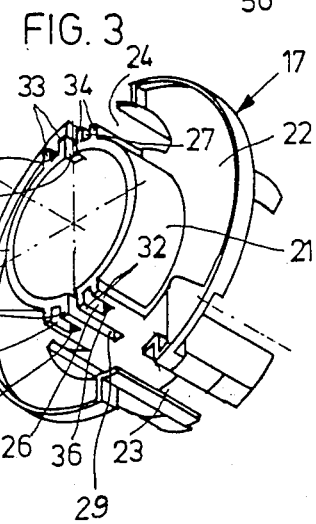
FIG. 3 is a perspective lateral view of an end plate of the stator with pocket-type hollow spaces, as a one piece component by itself.

Referring now to the drawings wherein like reference numerals are used to designate like parts, and more particularly to FIG. 1, wherein an axial fan is shown with fan blades 2 arranged within a conical fan cage 3 and directly on the bell-type external rotor 4 of an external rotor motor 5. The external rotor 4 is fastened on a hub 7 of the motor shaft 8 by means of a front-side ring disk 6. The shaft 8 is pivotally mounted in a bearing pipe 11 by means of two bearings 9 and 10. The bearing pipe 11 is pressed into a bundle of stator plates 12 so that it cannot be rotated, and is equipped with a fastening flange 13, located on an opposite end of the fan (from the ring disk 6) by means of screws 14 and fastening ring 15, to limit axial movement of the pipe 11 between ring 15 and disk 6. On the front surfaces of the rotor plate bundle 12 facing the shaft 8 are so-called end disks 16 and 17 arranged in an insulating way, to not only cover the front surface of the rotor plate bundle, but to also cover, at least partially, the circumferential surfaces of the stator plate bundle 12 on which the stator coils 18 are arranged. The end plate 17, in FIGS. 3 and 5, is shown as a separate component. The two end plates 16 and 17 are in each case equipped with so-called insulating cover plates 19 and 20 that protectively cover the stator coils 18 axially to the outside of the fan. The end plate 16, arranged on the front surface of the fan, has an insulation that is of a lower quality with respect to heat resistance then that used in prior devices.

The end plate (FIGS. 3 and 6) 17, that is disposed on the surface of the stator plate bundle 12 located on the side of the fastening ring 15, has, radially interiorly thereof, an axially outwardly projecting shell surface collar 21 and a radially extending flange ring 22 at right angles thereto. The flange ring 22 has recesses 23 and 24 at diametrically opposite points of its outer surface, for the axial guiding of the coil windings of the stator coils 18. Two pairs of pocket-type hollow spaces 25 and 26 or 27 and 28, respectively, are formed radially outward of the inner shell surface collar 21 and are separated from one another by an axial slots 29 and 30, respectively. FIGS. 3 and 6 show radial extending lateral limiting walls 31 and 32, or 33 and 34, of the individual pocket-type hollow spaces 25 to 28, extending over the whole axial length of the inner shell collar 21. The pocket hollow spaces also have circumferential radially exterior limiting walls 35 and 36 parallel to and separated from the inner shell surface 21. These exterior limiting walls do not extend for the whole axial length of the shell surface collar 21, but rather terminate at a certain distance "a" from the front edge 37 of the shell surface collar 21. Thus, the pockets 25 to 28 can be said to have an open axial end at the front edge 37 of the shell surface collar 21 with a partial radially directed opening connected thereto and of an axial distance "a".

The pocket-type hollow spaces 25 to 28, in axial direction, have an oblong shape. Current-supplying strand connectors 39 and 40 that are reinforced, by means of clamp plates 38 at their terminal ends or by soldering, are received as pairs into the pocket spaces 25 to 28 completely and preferably with a slight clamping effect, because of the oblong shape of the pockets, along with the corresponding shape of the pocket width, as shown in FIG. 1.

The double arrangement of two pairs of hollow spaces 25/26 and 27/38, respectively, is provided predominantly for reasons of symmetry. It is also possible, however, to use the pair of hollow spaces 27/28 for receiving a connection between the winding wire ends and a thermoswitch.

Figure 4:
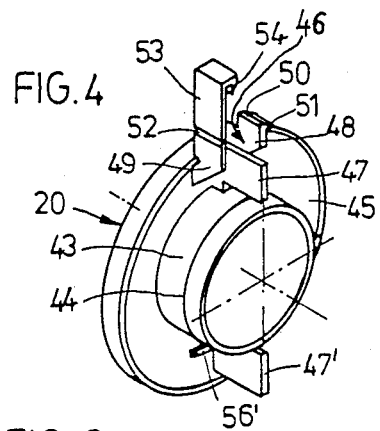
FIG. 4 is a perspective bottom view of an insulating cover plate, as a one piece component by itself.

As shown best in FIG. 6, the radially interior surface of the shell surface collar 21 has a circumferential lock edge 42 that is produced by a widened portion 41 of the inner diameter of the shell surface collar 21. The locking edge 42 is used to fasten the insulating cover plate 20 to the end plate 17. The insulating cover plate 20 of FIG. 4 has, at its interior edge, an axially extending hollow hub 43 (see FIG. 8) which, on its radially exterior shell surface, has a projecting and surrounding locking circumferential extending rib 44. When the cover plate 20 is joined to the end plate 17, locking rib 44 on the cover plate 20 slides on the interior surface of the shell surface collar collar over and behind the lock edge 42 thereon, as the hollow hub 43 of the cover plate 20 is pushed into the shell surface collar 21 of the end plate 17.

Figure 2:
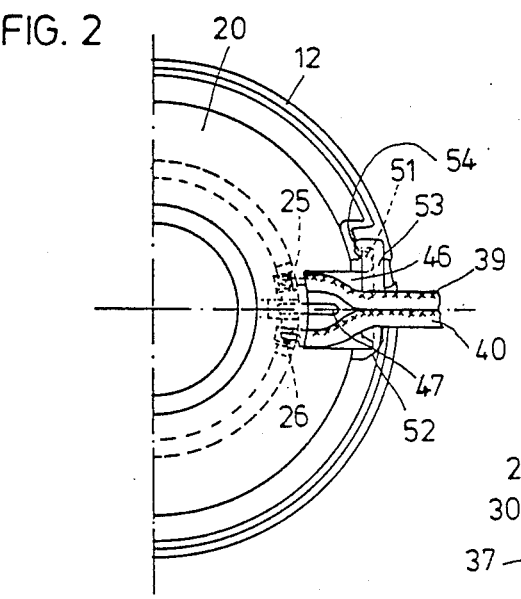
FIG. 2 is a view taken along the arrow II in FIG. 1.

Insulating end cover plate 20 has a flange ring 45 about its outer periphery and is provided with an approximately rectangular recess opening 46 at one point about its periphery. In the center of this opening recess 46 is a radially outwardly extending partition 47 that also extends in an axial direction in a length equal to the height of the hollow hub 43 (see FIG. 8). When the insulating cover plate 20 and the end plate 17 are fitted together, this partition 47 comes to be located in the slot 29 between the end pockets 25 and 26 in the shell surface 21 of the end plate 17. As shown in FIG. 2, this partition 47 insulatingly separates the two interior end sections of the strand connectors 39 and 40 from one another. Laterally, the recess 46 (see FIG. 7) is bordered by two radially extending, as well as axially inwardly and outwardly extending projecting wall elements 48 and 49. The wall element 48 projects radially to the outside slightly over the edge of the flange ring 45 at its section 50, and has an axially extending element detent 51 projecting away from the recess opening 46. The wall element 49, has a reduced cross-section hinge section 52, radially outwardly of which is a ring wall section 53. The hinge section 52 permits the ring wall section 53 to be folded over like a flap. This ring wall section 53 is shaped in one piece onto the wall element 49 and has a notch 54 at its outer end which faces the recess opening 46. When the ring wall segment 53 is bent about hinge 52, the notch 54 is locked with the detent 51 on the other wall element 48, as shown in FIG. 7 in dash-dotted lines and in FIG. 8 in drawnout lines.

Along a radial interior edge 55 of the flange ring 45 of insulating cover 20 and between wall elements 48 and 49, a circular shaped supporting rib 56 extends in an axial direction in parallel to the hollow internal hub 43 of the insulating cover 20. When the insulating cover plate 20 is fitted together with the end plate 17 in the way shown in FIG. 1, the interior edge of the recess opening 46 with the supporting rib 56 is arranged in such a way that it is located axially outside the pocket-type hollow spaces 25 and 26 or 27 and 28. The supporting rib 56 has an axial distance from the upper edge margins of the two radial limiting walls 35 and 36 of the hollow spaces 25 and 26 or 27 and 28, corresponding to approximately to a distance of 1.2 to 1.5 times the strand connector thickness.

During the fitting-together of the insulating cover 20 and the plate 17, the ends of the strand connectors 39 and 40 with their clamp plates 38 are axially moved inwardly into the pocket-type hollow spaces 25 and 26, as shown in FIG. 1. The strand connectors 39 and 40 are then bent outwardly in a radial direction to pass over the limit walls 36 on 37 of the end plate 17 by forming a deflection into where the recess 46 of the insulating cover 20 will be located, which until this time was open to the outside. The insulating cover is then slid on to the plate 17 such that locking edge 42 on the inside of hollow shell surface 21 is brought into locking arrangement with locking rib 44 on the hollow hub 43 of the insulating cover 20. This locking step defines the aforemention gap between the wall 36 of the plate 17 and the rib 56 on the radial edge 55 of the insulating cover. The connectors extend radially through this gap and then are axially deflected to pass by the edge 58 of the outer ring wall section 53. The outer ring wall section 54 is then bent about hinge 52 with notch 54 locking on detent 51 to hold the connector. The outer ring wall section 53 can be stiffened, or supported in a radial direction, such that a sufficient strain relief is ensured for the connectors 39 and 40 that are fitted into the pocket-type hollow spaces 25 and 26 and are reinforced by clamp plates 38.

When the opposite pocket-type hollow spaces 27 and 28 of the end plate 17 are to be used for receiving other or intermediate connectors, the insulating cover plate 20 (on the side that is diametrally opposite the recess 46), is equipped with an additional supporting rib 56' and a partition 47'. The supporting rib 56' is arranged symmetrically to the supporting rib 56 and the partition 57' is arranged symmetrically to the partition 47.

It should also be pointed out that the ring wall section 53 can also be folded over like a flap, on its interior side, along an edge 53'. When the insulating cover 20 and end plate 17 are connected, an edge rib 58 projecting into the recess 46 will cause a stiffening of the ring-wall section 53 and, on the other side, cause a radial narrowing of the recess 46 and thus provide for a narrow and more secure guidance for strand connectors 39 and 40 in this area.

The rear mounting plate assembly is similar to the front mounting assembly in that there is a locking mechanism between internal hubs similarly to that identified at 42 and 44 between the cover 20 and plate 17. In this regard the cooperating portions are identified as 16' and 19' in FIG. 1.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

What is claimed is:

1. An arrangement for mounting reinforced ends of strand connectors with stator winding ends in pocket-type hollow spaces of a coil-insulating part of a stator of a small electric motor comprising: axially extending pocket-type hollow spaces provided in an external shell surface of a cylindrical collar of an end plate arranged on a front surface of a stator plate bundle; an opening for each pocket-type hollow space; the pocket-type hollow spaces being arranged in pairs next to one another and insulatingly separated from one another; a ring-shaped insulating cover plate placed on the cylindrical collar of the end plate opposite openings of the pocket-type hollow spaces; a radial recess means in said ring-shaped insulating coverplate, in the area of the opening of the pocket-type hollow spaces: said recess means being circumscribed in part by an interior edge which is disposed radially outside the hollow spaces for causing bending of a strand connector located in said axial extending pocket-type hollow spaces, and in a first deflection at least approximately at a right angle and radially to the axial direction of the pocket-type hollow spaces; and the recess means, on a radial exterior side, being closed off by a ring wall section means of the ring-shape cover plate which ring wall section means causes bending of the strand connectors in a second deflection in an axial direction when said connectors are located in said axially extending pocket type hollow spaces.

2. An arrangement according to claim 1, wherein the ring wall section means of the insulating cover plate can be folded over by virtue of a reduced hinge section and such that a notch means thereon can be locked with a detent element on an opposite wall element of the cover so as to be able to hold the connectors in said second deflection.

3. An arrangement according to claim 1, wherein the insulating cover plate has a radially and axially extending partition that extends into the recess for physically separating two strand connectors from one another.

4. An arrangement according to claim 2, wherein the insulating cover plate has a radially and axially extending partition that extends into the recess for physically separating two strand connectors from one another.

5. An arrangement according to claim 1, wherein the interior edge means of the insulating cover plate is equipped with a supporting rib located radially outside the axially extending pocket-type hollow spaces and projecting in axial direction toward the opening of the hollow spaces.

6. An arrangement according to claim 2, wherein the interior edge means of the insulating cover plate is equipped with a supporting rib located radially outside the axially extending pocket-type hollow spaces and projecting in axial direction toward the opening of the hollow spaces.

7. An arrangement according to claim 3, wherein the interior edge means of the insulating cover plate is equipped with a supporting rib located radially outside the axially extending pocket-type hollow spaces and projecting in axial direction toward the opening of the hollow spaces.

8. An arrangement according to claim 4, wherein the interior edge means of the insulating cover plate is equipped with a supporting rib located radially outside the axially extending pocket-type hollow spaces and projecting in axial direction toward the opening of the hollow spaces.

9. An arrangement according to one of claim 1, wherein the interior edge means has a supporting rib which is axially spaced a short distance from an edge of the opening of said pocket-type hollow spaces (25, 26), and wherein said short distance is of such size to allow for a passage of a connector between the rib and the edge.

10. An arrangement according to one of claim 2, wherein the interior edge means has a supporting rib which is axially spaced a short distance from an edge of the opening of said pocket-type hollow spaces (25, 26), and wherein said short distance is of such size to allow for a passage of a connector between the rib and the edge 11. An arrangement according to one of claim 3, wherein the interior edge means has a supporting rib which is axially spaced a short distance from an edge of the opening of said pocket-type hollow spaces (25, 26), and wherein said short distance is of such size to allow for a passage of a connector between the rib and the edge.

12. An arrangement according to one of claim 4, wherein the interior edge means has a supporting rib which is axially spaced a short distance from an edge of the opening of said pocket-type hollow spaces (25, 26), and wherein said short distance is of such size to allow for a passage of a connector between the rib and the edge.

13. An arrangement according to one of claim 5, wherein the interior edge means has a supporting rib which is axially spaced a short distance from an edge of the opening of said pocket-type hollow spaces (25, 26), and wherein said short distance is of such size to allow for a passage of a connector between the rib and the edge.

14. An arrangement according to one of claim 6, wherein the interior edge means has a supporting rib which is axially spaced a short distance from an edge of the opening of said pocket-type hollow spaces (25, 26), and wherein said short distance is of such size to allow for a passage of a connector between the rib and the edge.

15. An arrangement according to one of claim 7, wherein the interior edge means has a supporting rib which is axially spaced a short distance from an edge of the opening of said pocket-type hollow spaces (25, 26), and wherein said short distance is of such size to allow for a passage of a connector between the rib and the edge.

16. An arrangement according to one of claim 8, wherein the interior edge means has a supporting rib which is axially spaced a short distance from an edge of the opening of said pocket-type hollow spaces (25, 26), and wherein said short distance is of such size to allow for a passage of a connector between the rib and the edge.

17. An arrangement according to claim 1, wherein the ring wall section means is provided with an edge rib that is projectable radially toward the pocket-type hollow spaces.

18. An arrangement according to claim 2, wherein the ring wall section means is provided with an edge rib that is projectable radially toward the pocket-type hollow spaces.

* * * * *